(12) United States Patent
Takahashi

(10) Patent No.: US 8,473,183 B2
(45) Date of Patent: Jun. 25, 2013

(54) CONTROL DEVICE FOR INTERNAL COMBUSTION ENGINE

(75) Inventor: Kiyonori Takahashi, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 49 days.

(21) Appl. No.: 13/258,820

(22) PCT Filed: Apr. 27, 2010

(86) PCT No.: PCT/JP2010/057500
§ 371 (c)(1),
(2), (4) Date: Sep. 22, 2011

(87) PCT Pub. No.: WO2011/135681
PCT Pub. Date: Nov. 3, 2011

(65) Prior Publication Data
US 2012/0035834 A1 Feb. 9, 2012

(51) Int. Cl.
F02D 37/02 (2006.01)
(52) U.S. Cl.
USPC ...... 701/104; 701/103; 701/105; 123/406.23; 123/406.44; 123/406.27
(58) Field of Classification Search
CPC ... F02D 37/02; F02D 2250/18; F02D 41/0002; F02D 2041/001; F02D 41/2467; F02D 41/1456; F02D 41/1454; F02D 11/105; F02P 17/12; F02P 5/1502
USPC .......... 123/406.23, 406.27, 406.44; 701/103, 701/104, 109, 110; 903/905
See application file for complete search history.

(56) References Cited

U.S. PATENT DOCUMENTS

| | | | | |
|---|---|---|---|---|
| 4,732,125 A | * | 3/1988 | Takizawa | 123/406.19 |
| 4,912,076 A | * | 3/1990 | Mizrah et al. | 502/300 |
| 5,638,790 A | * | 6/1997 | Minowa et al. | 123/436 |
| 6,704,641 B2 | * | 3/2004 | Tashiro et al. | 701/110 |
| 8,090,519 B2 | * | 1/2012 | Soejima et al. | 701/103 |
| 2004/0144360 A1 | * | 7/2004 | Surnilla et al. | 123/339.11 |
| 2008/0148711 A1 | | 6/2008 | Takubo | |

FOREIGN PATENT DOCUMENTS

| | | |
|---|---|---|
| JP | 9-240322 A | 9/1997 |
| JP | 9-250382 A | 9/1997 |
| JP | 11-82090 A | 3/1999 |
| JP | 2000-282940 A | 10/2000 |

(Continued)

Primary Examiner — Stephen K Cronin
Assistant Examiner — Raza Najmuddin
(74) Attorney, Agent, or Firm — Sughrue Mion, PLLC

(57) ABSTRACT

Disclosed is a control device that is used for an internal combustion engine and capable of periodically varying an air-fuel ratio while keeping torque generated by the internal combustion engine at a target torque. The control device can periodically vary a target air-fuel ratio and controls a fuel injection amount in accordance with the target air-fuel ratio which periodically varies. Further, the control device sets an air amount control torque in accordance with the target torque and calculates a target air amount for achieving the air amount control torque at a predetermined virtual air-fuel ratio. The control device then provides air amount control in accordance with the target air amount and calculates an air amount that is estimated to be achieved by the air amount control. Eventually, the control device calculates torque that is estimated to be achieved by the estimated air amount at the target air-fuel ratio, and provides ignition timing control so as to compensate for the difference between the estimated torque and the target torque by correcting ignition timing.

3 Claims, 3 Drawing Sheets

FOREIGN PATENT DOCUMENTS

| | | |
|---|---|---|
| JP | 2004-44511 A | 2/2004 |
| JP | 2005-113877 | 4/2005 |
| JP | 2006-112290 A | 4/2006 |
| JP | 2006-183637 A | 7/2006 |
| JP | 2008-157132 A | 7/2008 |
| JP | 2009-68430 A | 4/2009 |

* cited by examiner

CONTROL DEVICE FOR INTERNAL COMBUSTION ENGINE

CROSS REFERENCE TO RELATED APPLICATIONS

This application is a National Stage of International Application No. PCT/JP2010/057500 filed on Apr. 27, 2010, the contents of all of which are incorporated herein by reference in their entirety.

TECHNICAL FIELD

The present invention relates to a control device for an internal combustion engine, and more particularly to a control device that is used for an internal combustion engine and capable of controlling torque in accordance with an intake air amount, ignition timing, and an air-fuel ratio.

BACKGROUND ART

A torque demand control method for determining an operation amount of each actuator by using torque as a control amount is known as a method of controlling an internal combustion engine. An example of a control device for providing torque demand control is described in JP-A-2009-068430. This control device (hereinafter referred to as the conventional control device) provides torque control by exercising air amount control with a throttle and exercising ignition timing control with an ignition device. The conventional control device determines a target air amount in accordance with a target torque and calculates a throttle opening from the target air amount by using an inverse model of an air model. Further, the conventional control device uses the air model to calculate an estimated air amount that is attained by a current throttle opening, and then calculates an estimated torque from the estimated air amount. Subsequently, the conventional control device determines an ignition timing retard amount in accordance with the difference between the target torque and the estimated torque.

Meanwhile, not only the intake air amount and ignition timing but also the air-fuel ratio is closely related to torque generated by a spark-ignition internal combustion engine. Therefore, the intake air amount, fuel injection amount, and ignition timing are controlled in accordance with the target torque and target air-fuel ratio as described, for instance, in JP-A-11-82090. There is also a known technology for controlling the air-fuel ratio in accordance with the magnitude of torque generated by an internal combustion engine as described in JP-A-9-240322.

Further, there is a well-known technology for positively controlling the air-fuel ratio. This technology provides enhanced catalytic conversion efficiency by causing the air-fuel ratio to periodically vary around a stoichiometric value. If, in this instance, the torque periodically varies with the air-fuel ratio, driveability is impaired by a noticeable torque change. It is therefore necessary to devise a scheme for periodically varying only the air-fuel ratio while maintaining the torque constant.

The conventional control device has an air amount map for determining the target air amount from the target torque, and uses the air-fuel ratio as a map search key. Therefore, when the air-fuel ratio periodically varies, the target air amount also periodically varies with the air-fuel ratio. This causes the throttle opening to be controlled accordingly. In this instance, the throttle moves in such a manner that an increase/decrease in the air amount offsets torque variations caused by air-fuel ratio oscillation. More specifically, when the air-fuel ratio becomes richer, the throttle moves in a closing direction so that a resulting increase in the torque is canceled by a decrease in the air amount. When, in contrast, the air-fuel ratio becomes leaner, the throttle moves in an opening direction so that a resulting decrease in the torque is canceled by an increase in the air amount.

However, the air amount responds to a throttle movement with a delay. Therefore, the actual air amount changes with a delay in response to a change in the target air amount. Consequently, when the air-fuel ratio periodically oscillates, a phase difference arises between actual air amount changes and air-fuel ratio changes. To let air amount changes offset torque variations caused by air-fuel ratio oscillation, it is necessary that the air amount changes and air-fuel ratio changes be in opposite phase with each other. However, it is difficult for the conventional control device described above to completely eliminate torque variations caused by air-fuel ratio oscillation because there arises a phase difference between the air amount changes and air-fuel ratio changes.

As is obvious from the above, the conventional control device needs further improvement to achieve a target torque in a situation where the air-fuel ratio periodically varies.

SUMMARY OF THE INVENTION

An object of the present invention is to periodically vary the air-fuel ratio while keeping torque generated by an internal combustion engine at a target torque. In order to achieve the object, the present invention provides the following control device for an internal combustion engine.

The control device provided by the present invention sets a target torque and a target air-fuel ratio, and controls the air amount, ignition timing, and fuel injection amount in such a manner as to achieve the target torque and the target air-fuel ratio. The control device can periodically vary the target air-fuel ratio, and controls the fuel injection amount in accordance with the periodically varying target air-fuel ratio.

Further, the control device sets an air amount control torque on the basis of the target torque, and calculates a target air amount that achieves the air amount control torque at a predetermined virtual air-fuel ratio. The target air amount can be calculated by using predetermined data that associates an air-fuel ratio with an air amount versus torque relationship prevailing at an optimum ignition timing. The control device controls the air amount in accordance with the target air amount.

Moreover, the control device calculates an air amount that is estimated to be achieved by the above-described air amount control scheme, and calculates torque achieved by the estimated air amount on the presumption that the air-fuel ratio coincides with the target air-fuel ratio. The estimated torque can be calculated by using predetermined data that associates the air-fuel ratio with the air amount versus torque relationship prevailing at the optimum ignition timing. The control device controls the ignition timing by correcting the ignition timing so as to compensate for the difference between the estimated torque and the target torque.

According to the control device having the above-described configuration, periodic changes in the target air-fuel ratio are reflected not in the target air amount, but in the estimated torque that serves as the basis for ignition timing calculation. Therefore, when the air-fuel ratio periodically varies due to fuel injection amount control that is exercised in accordance with the target air-fuel ratio, ignition timing control is provided by offsetting resulting torque changes by retarding or advancing the ignition timing. This ensures that the torque generated by the internal combustion engine constantly coincides with the target torque even in a situation where the air-fuel ratio is periodically changing.

When the above-described ignition timing control scheme is employed, it is preferred that the ignition timing vary within a region that is retarded from the optimum ignition timing. The ignition timing should be varied within such a region to provide torque controllability based on ignition timing and prevent knocking. Such purposes can be achieved, for instance, by a method of setting a virtual air-fuel ratio or by a method of setting an air amount control torque.

When the method of setting the virtual air-fuel ratio is employed, the leanest air-fuel ratio prevailing when the target air-fuel ratio periodically changes is set as the virtual air-fuel ratio.

When, in contrast, the method of setting the air amount control torque is employed, the amplifying ratio of the air amount control torque to the target torque is determined in accordance with the difference between the virtual air-fuel ratio and the leanest air-fuel ratio prevailing when the target air-fuel ratio periodically changes. The target torque is then multiplied by the amplifying ratio, and the resulting torque is set as the air amount control torque.

When these methods are used, the air amount is increased by a torque amplitude resulting from air-fuel ratio changes. The central value of ignition timing is then retarded from the optimum ignition timing so as to offset a torque increase caused by the air amount increase. This makes it possible to ensure that the ignition timing varies within a region that is retarded from the optimum ignition timing.

MODE FOR CARRYING OUT THE INVENTION

First Embodiment

A first embodiment of the present invention will now be described with reference to FIGS. 1 and 2.

The internal combustion engine (hereinafter referred to as the engine) to be controlled in the embodiments of the present invention is a spark-ignition, four-cycle, reciprocating engine. The control device controls an operation of the engine by operating actuators incorporated in the engine. The actuators operable by the control device include, for instance, an ignition device, a throttle, a fuel injection device, a variable valve timing mechanism, and an EGR device. However, the control device according to the first embodiment operates the throttle, ignition device, and fuel injection device. The control device operates these three actuators to control torque that the engine outputs.

The control device according to the present embodiment uses the torque, air-fuel ratio, and efficiency as control amounts for the engine. In a precise sense, the term "torque" denotes an indicated torque, and the term "air-fuel ratio" denotes the air-fuel ratio of an air-fuel mixture that is to be burned. In this document, the term "efficiency" denotes the ratio of an actual output torque to a potential torque that can be output from the engine. The maximum value of efficiency is 1. When the efficiency is maximized, the potential torque that can be output from the engine is actually output intact. When the efficiency is lower than 1, the actual output torque is lower than the potential torque that can be output from the engine. In this instance, the resulting margin is mainly output from the engine in the form of heat.

Figure 1:
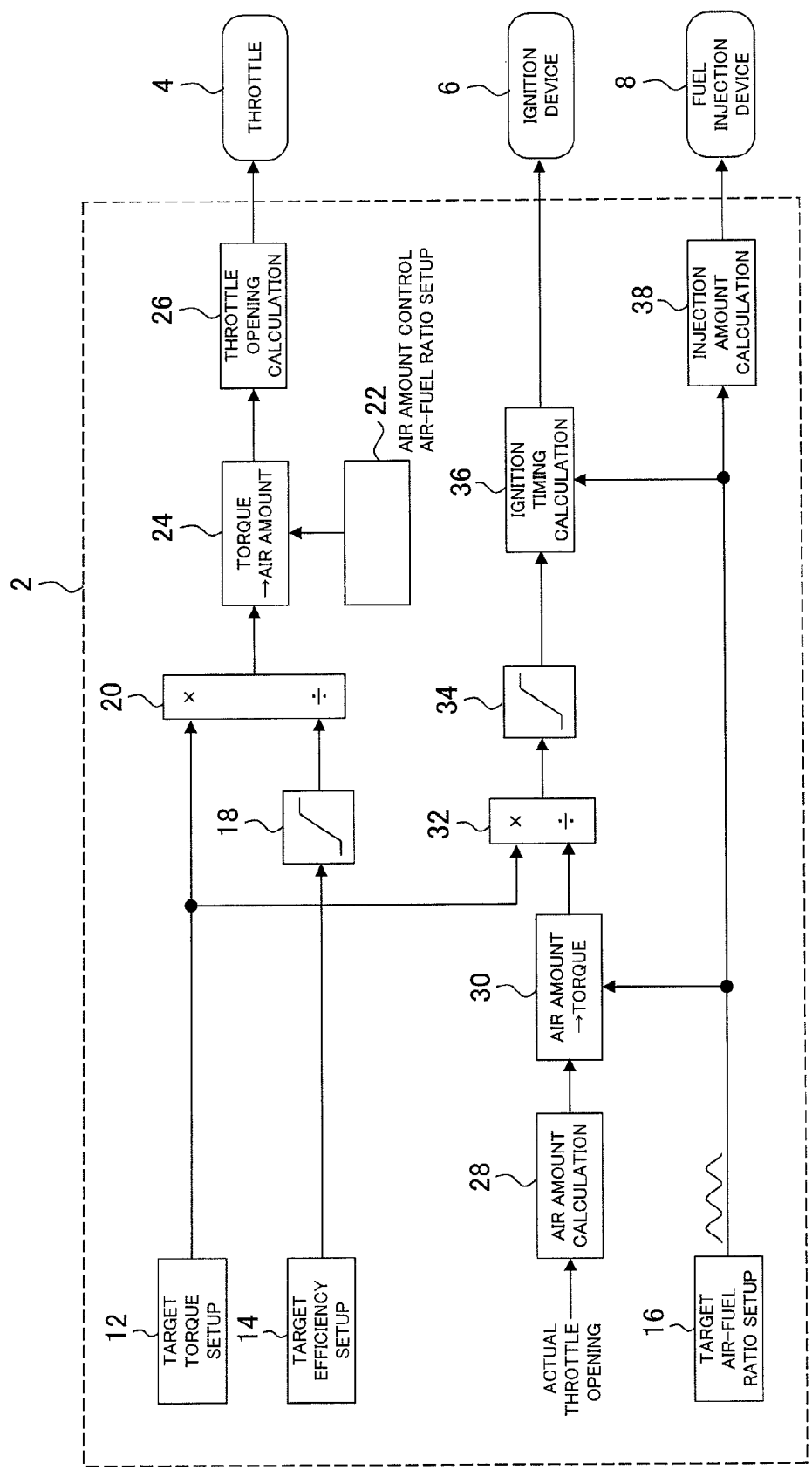
FIG. 1 is a block diagram illustrating a configuration of the control device according to a first and a second embodiment of the present invention.

The control device 2 shown in a block diagram of FIG. 1 is configured in accordance with the present embodiment. The control device 2 can be functionally divided into a target torque setup section 12, a target efficiency setup section 14, a target air-fuel ratio setup section 16, a combustion limit guard section 18, an air amount control torque calculation section 20, an air amount control air-fuel ratio setup section 22, a target air amount calculation section 24, a throttle opening calculation section 26, an estimated air amount calculation section 28, an estimated torque calculation section 30, an ignition timing control efficiency calculation section 32, a combustion limit guard section 34, an ignition timing calculation section 36, and a fuel injection amount calculation section 38. These elements 12 to 38 are especially selected from various functional elements of the control device 2 for illustration purposes because they are related to torque control and air-fuel ratio control that are exercised by three actuators, namely, the throttle 4, the ignition device 6, and the fuel injection device 8. Therefore, FIG. 1 does not mean that the control device 2 includes only these elements 12 to 38. The elements 12 to 38 may be implemented by respective dedicated hardware or virtually implemented by software through the use of the same hardware. The configuration of the control device 2 will now be described with main reference to the functions of the elements 12 to 38.

The target torque setup section 12 sets a target torque, which is an engine control amount, in accordance with engine operating conditions and operating status. More specifically, the target torque setup section 12 sets the target torque in accordance with the amount of accelerator pedal depression by a driver and vehicle control system signals such as VSC, TRC, and ECT.

The target efficiency setup section 14 sets a target efficiency, which is also an engine control amount, in accordance with engine operating conditions and operating status. The target efficiency is set to a value smaller than 1 when exhaust gas temperature is to be raised or a reserve torque is to be generated. In the present embodiment, however, it is assumed that the target efficiency is set to a maximum value of 1.

The target air-fuel ratio setup section 16 sets a target air-fuel ratio, which is also an engine control amount, in accordance with engine operating conditions and operating status. Under normal conditions, the target air-fuel ratio setup section 16 sets a stoichiometric air-fuel ratio as the target air-fuel ratio. However, under some specific conditions where, for example, the catalytic conversion efficiency is to be enhanced, the target air-fuel ratio setup section 16 can cause the target air-fuel ratio to periodically vary around a stoichiometric value. In the present embodiment, it is assumed that the target air-fuel ratio periodically varies around the stoichiometric value.

The target torque and the target efficiency are input into the air amount control torque calculation section 20. The air amount control torque calculation section 20 calculates an air amount control torque by dividing the target torque by the target efficiency. When the target efficiency is lower than 1, the air amount control torque is set to be higher than the target torque. In other words, it is demanded that the throttle be potentially capable of outputting torque higher than the target torque. However, a target efficiency that has passed through the combustion limit guard section 18 is input into the air amount control torque calculation section 20. The combustion limit guard section 18 uses a combustion limit guard to restrict the minimum value of target efficiency that is used to calculate the air amount control torque. In the present embodiment, the target efficiency is 1; therefore, the calculated air amount control torque is equal to the target torque.

The air amount control torque is input into the target air amount calculation section 24. The target air amount calculation section 24 converts the air amount control torque into a target air amount by using an air amount map. The term "air amount" used here denotes the amount of air taken into a cylinder (a filling efficiency or a load factor, which is a dimensionless equivalent of the air amount, may be used as an alternative). The air amount map is prepared on the presumption that the ignition timing is an optimum ignition timing (MBT or trace knock ignition timing, whichever is retarded). In the air amount map, various engine status amounts, such as an engine speed and air-fuel ratio, are used as keys to define the relationship between the torque and the air amount. Actual values and target values indicating the engine status amounts are used to search the air amount map. As regards the air-fuel ratio, however, an air amount control air-fuel ratio set by the air amount control air-fuel ratio setup section 22 is used to search the air amount map. Therefore, the target air amount calculation section 24 determines the target air amount for the engine by calculating the amount of air that is required to achieve the air amount control torque at the air amount control air-fuel ratio.

The air amount control air-fuel ratio setup section 22 generally sets the target air-fuel ratio, which is set by the target air-fuel ratio setup section 16, as the air amount control air-fuel ratio. However, when the target air-fuel ratio periodically varies around the stoichiometric value, the air amount control air-fuel ratio setup section 22 sets a predetermined virtual air-fuel ratio as the air amount control air-fuel ratio. In the present embodiment, the virtual air-fuel ratio used by the air amount control air-fuel ratio setup section 22 is equal to the leanest air-fuel ratio prevailing when the target air-fuel ratio periodically varies.

The target air amount is input into the throttle opening calculation section 26. The throttle opening calculation section 26 converts the target air amount into a throttle opening by using an inverse model of an air model (an air inverse model). The air model is a physical model representing the response characteristics of an air amount with respect to an operation of the throttle 4. Therefore, using the inverse model of the air model makes it possible to back-calculate a throttle opening that is required to achieve the target air amount.

The control device 2 operates the throttle 4 in accordance with the throttle opening calculated by the throttle opening calculation section 26.

In parallel with the above process, the control device 2 causes the estimated air amount calculation section 28 to calculate an estimated air amount in accordance with an actual throttle opening. The estimated air amount calculation section 28 converts the throttle opening into an air amount by using a forward model of the aforementioned air model. The estimated air amount is the amount of air that is estimated to be achieved when the control device 2 operates the throttle 4.

The estimated air amount is used when the estimated torque calculation section 30 calculates an estimated torque. In this document, the term "estimated torque" denotes torque that can be output when the optimum ignition timing is set as the ignition timing at a current throttle opening, that is, an estimated value of torque that the engine can potentially output. The estimated torque calculation section 30 converts the estimated air amount into the estimated torque by using a torque map. The torque map is an inverse of the aforementioned air amount map. In the torque map, various engine status amounts are used as keys to define the relationship between the torque and the air amount on the presumption that the ignition timing is an optimum ignition timing. The aforementioned air amount map search is conducted by using the air amount control air-fuel ratio as the air-fuel ratio. However, the torque map is searched by using the target air-fuel ratio set by the target air-fuel ratio setup section 16. Consequently, the estimated torque calculation section 30 calculates torque that is estimated to be achieved by the estimated air amount at the target air-fuel ratio.

The estimated torque and a duplicated target torque are input into the ignition timing control efficiency calculation section 32. The ignition timing control efficiency calculation section 32 calculates the ratio of the target torque to the estimated torque as an ignition timing control efficiency. The calculated ignition timing control efficiency is input into the ignition timing calculation section 36 through the combustion limit guard section 34. The combustion limit guard section 34 uses a combustion limit guard to restrict the minimum value of ignition timing control efficiency that is used to calculate the ignition timing.

The ignition timing calculation section 36 not only calculates the optimum ignition timing in accordance with the engine status amounts, such as the engine speed, air amount, and air-fuel ratio, but also calculates the amount of retard from the optimum ignition timing in accordance with the input ignition timing control efficiency. Eventually, the ignition timing calculation section 36 calculates a final ignition timing by adding the retard amount to the optimum ignition timing. The optimum ignition timing can be calculated, for instance, by using a map that defines the relationship between the optimum ignition timing and various engine status amounts. The retard amount can be calculated, for instance, by using a map that defines the relationship between the retard amount, ignition timing control efficiency, and various engine status amounts. When the ignition timing control efficiency is 1, the retard amount is considered to be zero. As the ignition timing control efficiency decreases from 1, the retard amount increases. Each map is searched by using actual values and target values of engine status amounts. As regards the air-fuel ratio, the target air-fuel ratio set by the target air-fuel ratio setup section 16 is used to conduct a map search.

The control device 2 operates the ignition device 6 in accordance with the ignition timing calculated by the ignition timing calculation section 36. The control device 2 also operates the fuel injection device 8 in accordance with the fuel injection amount calculated by the fuel injection amount calculation section 38. The fuel injection amount calculation section 38 calculates the fuel injection amount from the estimated air amount and the target air-fuel ratio set by the target air-fuel ratio setup section 16.

Figure 2:
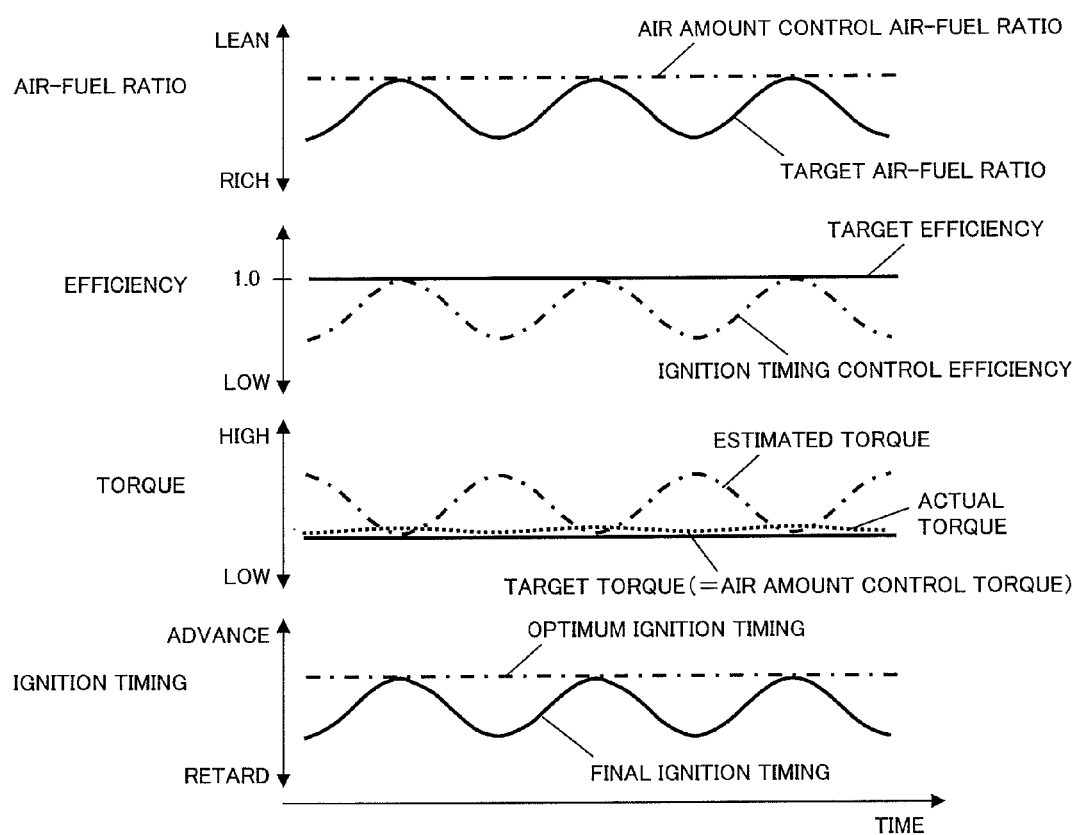
FIG. 2 is a diagram illustrating a scheme of engine control according to the first embodiment of the present invention and the result of such engine control.

FIG. 2 is a diagram illustrating the results of torque control and air-fuel ratio control that are exercised by the control device 2 according to the present embodiment. Effects of torque control and air-fuel ratio control that are provided by the present embodiment will now be described with reference to FIG. 2.

In the highest chart of FIG. 2, temporal changes in the target air-fuel ratio set by the target air-fuel ratio setup section 16 are indicated by a solid line while the virtual air-fuel ratio set by the air amount control air-fuel ratio setup section 22 is indicated by a one-dot chain line. In the second highest chart, temporal changes in the target efficiency set by the target efficiency setup section 14 are indicated by a solid line while the ignition timing control efficiency calculated by the ignition timing control efficiency calculation section 32 is indicated by a one-dot chain line. In the third highest chart, temporal changes in the target torque set by the target torque setup section 12 are indicated by a solid line while the estimated torque calculated by the estimated torque calculation section 30 is indicated by a one-dot chain line. In the present embodiment, the target torque coincides with the air amount control torque which is used to calculate the target air amount. Further, in the third highest chart, temporal changes in an actual torque, which is actually generated by the engine as a result of torque control by the control device 2, are indicated by a dotted line. In the lowest chart, temporal changes in the final ignition timing calculated by the ignition timing calculation section 36 are indicated by a solid line while the optimum ignition timing is indicated by a one-dot chain line.

As indicated in the highest chart, in the present embodiment, the leanest air-fuel ratio prevailing when the target air-fuel ratio periodically varies is set as the virtual air-fuel ratio. The control device 2 exercises air amount control in such a manner as to achieve the air amount control torque at the virtual air-fuel ratio, which is fixed. Therefore, when the target torque remains unchanged, control is exercised to provide a constant air amount even when the target air-fuel ratio periodically varies.

The estimated torque indicated in the third highest chart is torque that is estimated to be achieved when the air-fuel ratio varies in accordance with the target air-fuel ratio. When the target air-fuel ratio periodically varies around the stoichiometric value in a situation where control is exercised to provide a constant air amount, the estimated torque periodically varies around torque prevailing at the stoichiometric air-fuel ratio. The resulting minimum torque, that is, the value of torque estimated at the leanest air-fuel ratio, coincides with the value of the aforementioned air amount control torque. In the present embodiment, the air amount control torque coincides with the target torque because the target efficiency is set to 1. Therefore, the estimated torque remains not lower than the target torque and periodically varies in the increasing direction with respect to the target torque.

The ignition timing control efficiency indicated in the second highest chart is the ratio of the target torque to the estimated torque which varies periodically. Therefore, the ignition timing control efficiency becomes maximized to 1 when the estimated torque coincides with the target torque, and periodically varies in the decreasing direction in accordance with changes in the estimated torque. Consequently, as indicated in the lowest chart, the final ignition timing periodically varies in the retarding direction with respect to the optimum ignition timing.

As described above, the present embodiment is configured so that periodical changes in the target air-fuel ratio around the stoichiometric value are reflected not in the target air amount, but only in the estimated torque that serves as the basis for ignition timing calculation. Therefore, when the air-fuel ratio periodically varies due to fuel injection amount control that is exercised in accordance with the target air-fuel ratio, ignition timing control is provided so as to offset resulting torque changes by retarding the ignition timing. This ensures that the actual torque, which is actually generated by the engine, constantly coincides with the target torque even in a situation where the air-fuel ratio is periodically varying.

Further, the present embodiment calculates the target air amount with respect to the leanest air-fuel ratio prevailing when the target air-fuel ratio periodically varies. Therefore, the air amount is increased by a torque amplitude resulting from air-fuel ratio changes. The central value of ignition timing is then retarded from the optimum ignition timing so as to offset a torque increase caused by the air amount increase. As the present embodiment allows the ignition timing to vary within a region that is retarded from the optimum ignition timing, it is possible to provide torque controllability based on ignition timing and prevent knocking.

Second Embodiment

A second embodiment of the present invention will now be described with reference to FIGS. 1 and 3.

The control device 2 according to the second embodiment has the same configuration as the first embodiment, which is configured as shown in the block diagram of FIG. 1. The second embodiment differs from the first embodiment in the target efficiency setting and air amount control air-fuel ratio setting when the target air-fuel ratio periodically varies around the stoichiometric value.

The target efficiency setup section 14 sets the target efficiency in accordance with the amplitude of the target air-fuel ratio that prevails when the target air-fuel ratio periodically varies, that is, in accordance with the difference between the leanest air-fuel ratio and the stoichiometric air-fuel ratio. As the amplitude of the target air-fuel ratio increases, the target efficiency decreases from 1. As a result, the air amount control torque, which is obtained by dividing the target torque by the target efficiency, is set to be higher than the target torque. In the present embodiment, the target efficiency is set so as to ensure that the amplifying amount of the air amount control torque to the target torque coincides with the torque amplitude resulting from periodic changes in the target air-fuel ratio.

In the present embodiment, the aforementioned increased air amount control torque is input into the target air amount calculation section 24. The target air amount calculation section 24 converts the air amount control torque into a target air amount by using the air amount map. The air amount map is searched by using the air amount control air-fuel ratio, which is set by the air amount control air-fuel ratio setup section 22. When the target air-fuel ratio periodically varies around the stoichiometric value, the air amount control air-fuel ratio setup section 22 sets a predetermined virtual air-fuel ratio as the air amount control air-fuel ratio, as is the case with the first embodiment. In the present embodiment, however, the stoichiometric air-fuel ratio, which corresponds to the oscillation center of the target air-fuel ratio, is used as the virtual air-fuel ratio. Therefore, in the target air amount calculation section 24, the amount of air required to achieve the air amount control torque at the stoichiometric air-fuel ratio is calculated as the target air amount for the engine.

Figure 3:
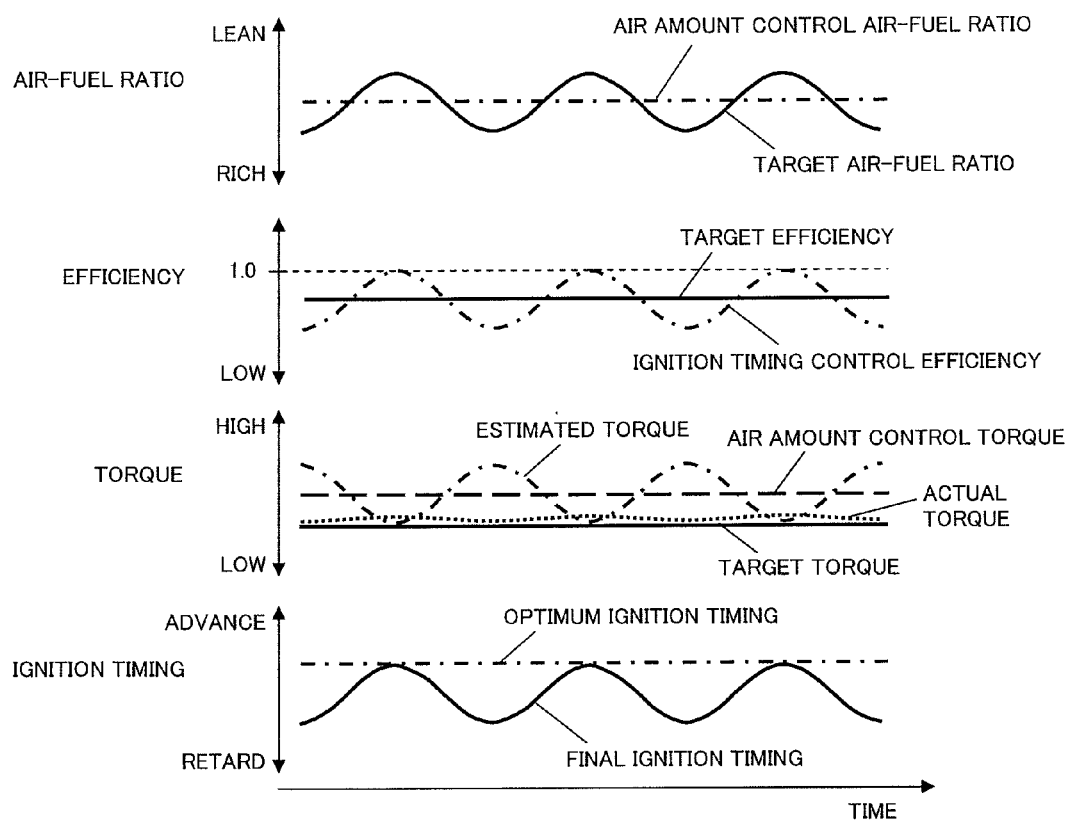
FIG. 3 is a diagram illustrating a scheme of engine control according to the second embodiment of the present invention and the result of such engine control.

FIG. 3 is a diagram illustrating the results of torque control and air-fuel ratio control that are exercised by the control device 2 according to the present embodiment. Effects of torque control and air-fuel ratio control that are provided by the present embodiment will now be described with reference to FIG. 3.

In the highest chart of FIG. 3, temporal changes in the target air-fuel ratio set by the target air-fuel ratio setup section 16 are indicated by a solid line while temporal changes in the virtual air-fuel ratio set by the air amount control air-fuel ratio setup section 22 are indicated by a one-dot chain line. In the second highest chart, temporal changes in the target efficiency set by the target efficiency setup section 14 are indicated by a solid line while temporal changes in the ignition timing control efficiency calculated by the ignition timing control efficiency calculation section 32 are indicated by a one-dot chain line. In the third highest chart, temporal changes in the target torque set by the target torque setup section 12 are indicated by a solid line while temporal changes in the air amount control torque calculated by the air amount control torque calculation section 20 are indicated by a broken line. Further, in the third highest chart, temporal changes in the estimated torque calculated by the estimated torque calculation section 30 are indicated by a one-dot chain line while temporal changes in the actual torque, which is actually generated by the engine as a result of torque control by the control device 2, are indicated by a dotted line. In the lowest chart, temporal changes in the final ignition timing calculated by the ignition timing calculation section 36 are indicated by a solid line while temporal changes in the optimum ignition timing are indicated by a one-dot chain line.

As indicated in the second highest chart, the present embodiment sets the target efficiency to a value lower than 1. Consequently, the air amount control torque is set to be higher than the target torque as indicated in the third highest chart.

As indicated in the highest chart, the virtual air-fuel ratio set by the present embodiment is equal to the stoichiometric air-fuel ratio, that is, the central value prevailing when the target air-fuel ratio periodically varies. The control device 2 exercises air amount control in such a manner as to achieve the air amount control torque at the predetermined virtual air-fuel ratio. Therefore, when the target torque remains unchanged, control is exercised to provide a constant air amount even when the target air-fuel ratio periodically varies.

The estimated torque indicated in the third highest chart is torque that is estimated to be achieved when the air-fuel ratio varies in accordance with the target air-fuel ratio. When the target air-fuel ratio periodically varies around the stoichiometric value in a situation where control is exercised to provide a constant air amount, the estimated torque periodically varies around torque prevailing at the stoichiometric air-fuel ratio. The resulting torque at the stoichiometric air-fuel ratio coincides with the aforementioned air amount control torque. The aforementioned target efficiency is set so that the amplifying amount of the air amount control torque to the target torque coincides with the amplitude of the estimated torque.

The ignition timing control efficiency indicated in the second highest chart is the ratio of the target torque to the estimated torque which varies periodically. Therefore, the ignition timing control efficiency becomes maximized to 1 when the estimated torque coincides with the target torque, and periodically varies in the decreasing direction in accordance with changes in the estimated torque. Consequently, as indicated in the lowest chart, the final ignition timing periodically varies in the retarding direction with respect to the optimum ignition timing.

As described above, the present embodiment is configured so that periodical changes in the target air-fuel ratio around the stoichiometric value are reflected not in the target air amount, but only in the estimated torque that serves as the basis for ignition timing calculation. Therefore, when the air-fuel ratio periodically varies due to fuel injection amount control that is exercised in accordance with the target air-fuel ratio, ignition timing control is provided so as to offset resulting torque changes by retarding the ignition timing. This ensures that the actual torque, which is actually generated by the engine, constantly coincides with the target torque even in a situation where the air-fuel ratio is periodically varying. It means that the present embodiment produces the same effects as the first embodiment.

Other

While the present invention has been described in terms of preferred embodiments, it should be understood that the present invention is not limited to those preferred embodiments. The present invention extends to various modifications that nevertheless fall within the scope and spirit of the present invention. For example, although the foregoing embodiments use the throttle as an actuator for controlling the air amount, an intake valve that can vary a lift amount or operating angle may alternatively be used.

The center of oscillation in the case where the target air-fuel ratio periodically varies is not limited to the stoichiometric air-fuel ratio. The center of oscillation of the target air-fuel ratio may be set within a region that is leaner or richer than the stoichiometric air-fuel ratio.

The virtual air-fuel ratio for air amount control, which is used to calculate the target air amount, may be an air-fuel ratio other than the leanest air-fuel ratio and central air-fuel ratio that prevail when the target air-fuel ratio periodically varies.

The target efficiency may be set independently of the target air-fuel ratio and of the virtual air-fuel ratio for air amount control. In other words, the target efficiency need not always be set in such a manner that the optimum ignition timing is the most advanced ignition timing prevailing when the final ignition timing periodically varies, as described in connection with the foregoing embodiments. When, for instance, exhaust gas temperature is to be raised, the target efficiency setting can be decreased so as to further retard the ignition timing.

Although the foregoing embodiments use the torque, air-fuel ratio, and efficiency as engine control amounts, an alternative is to use only the torque and air-fuel ratio as the engine control amounts. In other words, an efficiency setting of 1 may be used at all times. In such an instance, the calculated air amount control torque is equal to the target torque.

DESCRIPTION OF REFERENCE NUMERALS

2 Controller
4 Throttle
6 Ignition device
8 Fuel injection device
12 Target torque setup section
14 Target efficiency setup section
16 Target air-fuel ratio setup section
20 Air amount control torque calculation section
22 Air amount control air-fuel ratio setup section
24 Target air amount calculation section
26 Throttle opening calculation section
28 Estimated air amount calculation section
30 Estimated torque calculation section
32 Ignition timing control efficiency calculation section
36 Ignition timing calculation section
38 Fuel injection amount calculation section

The invention claimed is:

1. A control device for an internal combustion engine, comprising:
    target torque setup means for setting a target torque;
    target air-fuel ratio setup means for setting a target air-fuel ratio and periodically varying the target air-fuel ratio;
    air amount control torque setup means for setting an air amount control torque in accordance with the target torque;
    target air amount calculation means for calculating a target air amount, which is an air amount required in order to achieve the air amount control torque at a predetermined virtual air-fuel ratio, in accordance with predetermined data that associates an air-fuel ratio with an air amount versus torque relationship prevailing at an optimum ignition timing;

air amount control means for controlling an air amount in accordance with the target air amount;

estimated air amount calculation means for calculating an air amount that is estimated to be achieved by the air amount control;

estimated torque calculation means for calculating an estimated torque in accordance with the predetermined data that associates the air-fuel ratio with the air amount versus torque relationship prevailing at the optimum ignition timing, the estimated torque being estimated to be achieved by the estimated air amount at the target air-fuel ratio;

ignition timing control means for providing ignition timing control by correcting ignition timing so as to compensate for the difference between the estimated torque and the target torque; and fuel injection amount control means for controlling a fuel injection amount in accordance with the target air-fuel ratio.

2. The control device for the internal combustion engine according to claim 1, further comprising:

virtual air-fuel ratio setup means for setting the virtual air-fuel ratio, the virtual air-fuel ratio being equivalent to the leanest air-fuel ratio prevailing when the target air-fuel ratio periodically varies.

3. The control device for the internal combustion engine according to claim 1, wherein the air amount control torque setup means includes means for determining the amplifying ratio of the air amount control torque to the target torque in accordance with the difference between the virtual air-fuel ratio and the leanest air-fuel ratio prevailing when the target air-fuel ratio periodically varies, and means for setting torque obtained by multiplying the target torque by the determined amplifying ratio as the air amount control torque.

* * * * *